United States Patent Office 3,268,536
Patented August 23, 1966

3,268,536
O-(QUINOLYL) O-ALKYL PHOSPHOR-AMIDOTHIOATES
Raymond H. Rigterink, Midland, Mich., assignor to The Dow Chemical Company, Midland, Mich., a corporation of Delaware
No Drawing. Filed Jan. 8, 1964, Ser. No. 336,367
7 Claims. (Cl. 260—283)

This is a continuation-in-part of my copending application Serial No. 258,644, filed February 14, 1963, which latter application is a continuation-in-part of my copending application Serial No. 107,905, filed May 5, 1961, both now abandoned.

The present invention is directed to the phosphoramidothioates corresponding to the formula:

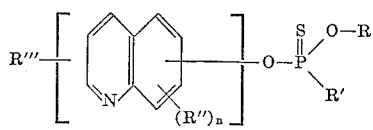

In this and succeeding formulae, R represents lower alkyl, R' represents amino or lower alkylamino, R" represents hydrogen, chlorine or bromine, R'" represents hydrogen or methyl and $n$ represents an integer not greater than 3. In the present specification and claims, the expression "lower alkyl" is employed to refer to the alkyl radicals containing from 1 to 5 carbon atoms, inclusive. These compounds are liquid or crystalline materials which are somewhat soluble in many common organic solvents and of very low solubility in water. The compounds are useful as parasiticides and herbicides and are adapted to be employed for the control of many plants, mites, insects and bacterial and fungal organisms such as aphids, beetles, ticks, fleas, screw worms, ascarids, helminths, Ancylostoma and Cabomba.

Preferred compounds of the present invention correspond to the formulae:

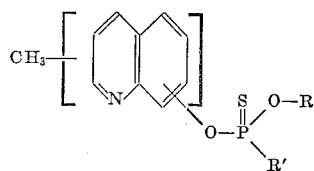

and

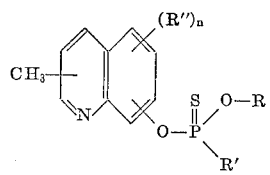

The novel compounds of the present invention may be prepared by several methods. In a preferred method, the compounds are prepared by reacting an O-lower alkyl phosphoramidochloridothioate corresponding to the formula

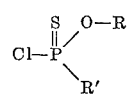

with a quinolinol corresponding to the formula

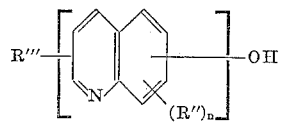

or with an alkali metal salt of said quinolinol compound. In such method, the reaction between the phosphoramidochloridothioate and quinolinol compound is carried out in the presence of an alkali metal salt such as an alkali metal carbonate. The reaction conveniently is carried out in an inert organic liquid such as dimethyl formamide, ethyl acetate, benzene, toluene, chloroform or acetone. The amounts of the reagents to be employed are not critical, some of the desired product being obtained when employing any proportion of the reagents. In the preferred method of operation, good results are obtained when employing substantially equimolecular proportions of the alkali metal carbonate, the quinolinol compound and phosphoramidochloridothioate, or substantially equimolecular proportions of the alkali metal salt of the quinolinol compound and the phosphoramidochloridothioate. The reaction takes place smoothly at the temperature range of from 10° to 100° C. with the production of the desired product and alkali metal chloride by-product. In carrying out the reaction, the reactants are mixed and contacted together in any convenient fashion and the resulting mixture maintained for a period of time in the reaction temperature range to insure completion of the reaction. Following the reaction, the reaction mixture is washed with water and any reaction medium removed by fractional distillation under reduced pressure to obtain the desired product as a residue. This product may be further purified by conventional procedures such as washing with dilute aqueous alkali metal hydroxide and washing with water, solvent extraction and recrystallization.

In an alternative procedure, the new compounds are prepared by reacting an O-lower alkyl phosphorodichloridothioate having the structure

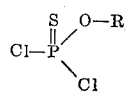

with an alkali metal salt of the quinolinol compounds as previously defined to produce an intermediate diester phosphorochloridothioate having the structure:

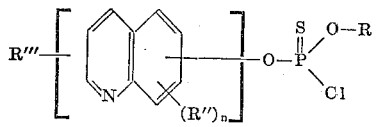

This intermediate is thereafter reacted with ammonia or a lower alkylamine to produce the desired phosphoramidothioate product. The reaction conveniently is carried out in a reaction medium such as benzene, chloroform, toluene or dimethyl formamide. Good results are obtained when employing substantially equimolecular proportions of the phosphorodichloridothioate and alkali metal salt compound and at least two molecular proportions of ammonia or alkylamine. The reaction with the alkali metal salt of the quinolinol compound is carried out at temperatures of from —40° to 70° C. The reaction between the phosphorochloridothioate intermediate and ammonia or lower alkylamine takes place smoothly at the temperature range of from —10° to 30° C. The temperature may be controlled by regulating the rate of mixing and contacting the reactants together and by external cooling. The by-product in both steps of the reaction is chloride. In the first step, the chloride appears as an alkali metal chloride. In the second step, the chloride appears as the hydrochloride salt of the amine or ammonia reactants. Following the reaction, the desired product may be separated in accordance with conventional procedures as previously described.

The following examples merely illustrate the invention and are not to be construed as limiting.

Example 1.—O-(8-quinolyl) O-methyl N-methyl phosphoramidothioate 8-quinolinol (43.5 grams; 0.3 mole), aqueous 50 percent sodium hydroxide (equivalent to 0.3 mole of NaOH), 30 milliliters of water, 150 milliliters of dimethyl formamide and 500 milliliters of benzene were mixed together and heated at the boiling temperature to prepare the sodium salt of the 8-quinolinol. The heating was carried out with the distillation of some of the reaction medium together with the water of reaction as formed. O-methyl N-methyl phosphoramidochloridothioate (48 grams; 0.3 mole) was added rapidly with stirring and at a temperature of from 24° to 46° C. to the above mixture containing the sodium salt. Stirring was thereafter continued and the temperature of the mixture raised to and maintained at from 60° to 65° C. for two hours to insure completion of the reaction. The reaction mixture was then washed with water and low boiling constituents removed from the washed mixture by distillation under reduced pressure to obtain an O-(8-quinolyl) O-methyl N-methyl phosphoramidothioate product as a crystalline residue. This product was recrystallized from ethanol and found to melt at 74° to 75.5° C. and have a nitrogen content of 10.13 percent as compared to a theoretical content of 10.43 percent.

Example 2.—O-(7-quinolyl) O-methyl N-methyl phosphoramidothioate 7-quinolinol (3.3 grams; 0.023 mole), aqueous 50 percent sodium hydroxide (equivalent to 0.023 mole of NaOH), 200 milliliters of benzene and 50 milliliters of dimethyl formamide were mixed together and heated at the boiling temperature as previously described to prepare the sodium salt of the 7-quinolinol. O-methyl N-methyl phosphoramidochloridothioate (3.7 grams; 0.023 mole) was added rapidly with stirring and at a temperature of 26° C. to the above mixture containing the salt. Stirring was thereafter continued and the mixture heated to and maintained at from 60° to 65° C. for 2.0 hours to insure completion of the reaction. The reaction mixture was then successively washed with water and low boiling constituents removed from the washed product by distillation under pressure to obtain an O-(7-quinolyl) O-methyl N-methyl phosphoramidothioate product as an oil. This product was an amber liquid having a refractive index $n/D$ of 1.5595 at 25° C.

Example 3.—O-(8-quinolyl) O-methyl N-diethyl phosphoramidothioate 8-quinolinol (14.5 grams; 0.1 mole), aqueous 50 percent sodium hydroxide (equivalent to 0.1 mole of NaOH) and 250 milliliters of isobutyl methyl ketone were mixed together and heated at the boiling temperature in the manner as previously described to prepare the sodium salt of 8-quinolinol. This salt mixture was diluted with 50 milliliters of dimethyl formamide and O-methyl phosphorodichloridothioate (16.5 grams; 0.1 mole) added rapidly thereto with stirring and at a temperature from 6° to 30° C. Stirring was thereafter continued for 0.5 hour to insure the completion of the reaction and the production of the O-(8-quinolyl) O-methyl phosphorochloridothioate intermediate. Diethylamine (14.6 grams; 0.2 mole) was then added with stirring to the above mixture containing the phosphorochloridothioate intermediate. The addition was carried out over a period of about 10 minutes and at a temperature of 10° C. with stirring being continued for 0.5 hour to insure completion of the reaction. The reaction mixture was then filtered and low boiling constituents removed from the filtrate by vacuum distillation to obtain an O-(8-quinolyl) O-methyl N-diethyl phosphoramidothioate product as a liquid residue having a refractive index $n/D$ of 1.5657 at 25° C. and a sulfur content of 10.34 percent as compared with a theoretical content of 10.31 percent.

Example 4.—O-(2-methyl-8-quinolyl) O-methyl N-methyl phosphoramidothioate 8-quinaldinol (15.9 grams; 0.1 mole), water (10 milliliters), 50 percent NaOH (8 grams; 0.1 mole), dimethyl formamide (50 milliliters) and benzene (200 milliliters) were mixed together and heated as previously described to prepare the sodium salt of 8-quinaldinol. O-methyl methylphosphoramidochloridothioate was added all at once, with stirring and at room temperature, to the above mixture containing the sodium salt. Stirring was thereafter continued and the temperature of the mixture raised to and maintained at from 60° to 65° C. for two hours to insure completion of the reaction. The reaction mixture was washed with water and low boiling constituents removed from the washed mixture by distillation under reduced pressure to obtain an O-(2-methyl-8-quinolyl) O-methyl N-methyl phosphoramidothioate product as an oily solid. This oily solid was recrystallized from 25 milliliters of 95 percent ethanol. The recrystallized product melted at 102°–105° C.

Example 5.—O-(6-quinolyl) O-methyl N-methyl phosphoramidothioate 6-quinolinol (2.9 grams; 0.02 mole), aqueous 50 percent sodium hydroxide (equivalent to 0.02 mole of NaOH), 50 milliliters of dimethyl formamide and 200 milliliters of benzene were mixed together and heated at the boiling temperature as previously described to prepare the sodium salt of the 6-quinolinol. O-methyl N-methyl phosphoramidochloridothioate (3.2 grams; 0.02 mole) was added rapidly with stirring and at room temperature to the above mixture containing the sodium salt. Stirring was thereafter continued and the temperature of the mixture raised to and maintained at from 60° to 65° C. for two hours to insure completion of the reaction. The reaction mixture was then washed with water and low boiling constituents removed from the washed mixture by distillation under reduced pressure to obtain an O-(6-quinolyl) O-methyl N-methyl phosphoramidothioate product as a liquid residue having a refractive index $n/D$ of 1.5845 at 25° C.

In a similar manner, other products of the present invention are prepared as follows:

O-(8-quinolyl) O-methyl N-isopropyl phosphoramidothioate ($n/D$ of 1.5742 at 25° C.) by reacting together the sodium salt of 8-quinolinol, O-methyl phosphorodichloridothioate and isopropylamine.

O-(8-quinolyl) O-methyl N-isobutyl phosphoramidothioate ($n/D$ of 1.5721 at 25° C.) by reacting together 8-quinolinol, potassium carbonate and O-methyl N-isobutyl phosphoramidochloridothioate.

O-(8-quinolyl) O-ethyl N-ethyl phosphoramidothioate by reacting together the sodium salt of 8-quinolinol and O-ethyl N-ethyl phosphoramidochloridothioate.

O-(8-quinolyl) O-isopropyl N-isopropyl phosphoramidothioate ($n/D$ of 1.5403 at 25° C.) by reacting together 8-quinolinol, potassium carbonate and O-isopropyl N-isopropyl phosphoramidochloridothioate.

O-(8-quinolyl) O-propyl N-propyl phosphoramidothioate ($n/D$ of 1.5605 at 25° C.) by reacting together O-quinolinol, sodium carbonate and O-propyl N-propyl phosphoramidochloridothioate.

O-(5-quinolyl) O-amyl N-dibutyl phosphoramidothioate by reacting together 5-quinolinol, sodium carbonate and O-amyl N-dibutyl phosphoramidochloridothioate.

O-(6,7-dichloro-5-quinolyl) O-methyl N-methyl phosphoramidothioate by reacting together the sodium salt of 6,7-dichloro-5-quinolinol, O-methyl phosphorodichloridothioate and methylamine.

O-(8-quinolyl) O-isobutyl N-methyl phosphoramidothioate ($n/D$ of 1.5742 at 25° C.) by reacting together the sodium salt of 8-quinolinol and O-isobutyl N-methyl phosphoramidochloridothioate.

O-(5,7-dibromo-8-quinolyl) O-methyl N-methyl phosphoramidothioate (melting at 115° to 117° C.) by reacting together 5,7-dibromo-8-quinolinol, sodium carbonate and O-methyl N-methyl phosphoramidochloridothioate.

O - (5 - methyl-7-quinolyl) O-butyl N-amyl phosphoramidothioate by reacting together potassium carbonate, 5 - methyl - 7 - quinolinol and O-butyl N-amyl phosphoramidochloridothioate.

O-(2-methyl-7-bromo-8-quinolyl) O-methyl N-isopropyl phosphoramidothioate by reacting together sodium carbonate, 2-methyl-7-bromo-8-quinolinol and O-methyl N-isopropyl phosphoramidochloridothioate.

O - [4 - methyl - 6,7 - dichloro-5-quinolyl] O-ethyl N-n-butyl phosphoramidothioate by reacting together the sodium salt of 4 - methyl - 6,7 - dichloro-5-quinolinol, O-ethyl phosphoramidochloridothioate and n-butylamine.

O-(5-methyl-6-bromo-8-quinolyl) O-methyl N-methyl phosphoramidothioate by reacting together potassium carbonate, 5-methyl-6-bromo-8-quinolinol and O-methyl N-methyl phosphoramidochloridothioate.

O - (3 - methyl-8-quinolyl) O-amyl N-isopropyl phosphoramidothioate by reacting together 3 - methyl - 8 - quinolinol, potassium carbonate and O-amyl N-isopropyl phosphoramidochloridothioate.

O - (4 - methyl-6-quinolyl) O-isobutyl N-methyl phosphoramidothioate by reacting the sodium salt of 4-methyl-6-quinolinol and O-isobutyl N-methyl phosphoramidochloridothioate.

O-(7-methyl-6-quinolyl) O-methyl N-ethyl phosphoramidothioate by reacting together 7-methyl-6-quinolinol, O - methyl N - ethyl phosphoramidochloridothioate and sodium carbonate.

O-(6-methyl-8-quinolyl) O-propyl N-tert.-butyl phosphoramidothioate by reacting together the potassium salt of 6-methyl-8-quinolinol and O-propyl N-tert.-butyl phosphoramidochloridothioate.

The new compounds of the present invention are useful as herbicides and parasiticides for the control of a number of plant and parasite species. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as toxic constituents in solvent solutions, oil-in-water or water-in-oil emulsions, aqueous dispersions or animal feeds, concentrates or supplements. In representative operations, aqueous compositions containing 500 parts per million by weight of O-(8-quinolyl) O-methyl N-methyl phosphoramidothioate give 100 percent controls of mites, plum curculio, Daphnia and Cabomba.

In representative operations against screw worms, substantially complete kills are obtained with O-(8-quinolyl) O - methyl N - methyl phosphoramidothioate when employed systemically in animals at dosages of 10 milligrams per kilogram of body weight. In representative operations against cattle grubs, substantially complete kills are obtained with O-(2-methyl-8-quinolyl) O-methyl N-methyl phosphoramidothioate when employed systemically in cattle at dosages of 25 milligrams per kilogram of body weight. In representative operations against fleas and ticks, substantially complete kills are obtained with O-(8-quinolyl) O-methyl N-methyl phosphoramidothioate when employed systemically in animals such as dogs at dosages of 50 milligrams per kilogram of body weight.

In representative operations against flies, substantially complete kills are obtained with O-(8-quinolyl) O-methyl N-methyl phosphoramidothioate, O-(2-methyl-8-quinolyl) O-methyl N-methyl phosphoramidothioate, O-(8-quinolyl) O-methyl N-isopropyl phosphoramidothioate and O-(8-quinolyl) O-methyl N-isobutyl phosphoramidothioate when employed systemically in animals at dosages of 100 milligrams per kilogram of body weight. In representative operations against such helminth species as Cooperia sp., Ostertagi sp., Trichostrongylus sp., *Haemonchus contortus* and Esophagostomum sp., substantially complete controls are obtained with O-(8-quinolyl) O-methyl N-methyl phosphoramidothioate, O-(8-quinolyl) O-methyl N-isopropyl phosphoramidothioate, O-(8-quinolyl) O-ethyl N-ethyl phosphoramidothioate and O-(2-methyl-8-quinolyl) O-methyl N-methyl phosphoramidothioate when employed at concentrations of 300 parts per million by weight. Similarly, O-(8-quinolyl) O-methyl N-methyl phosphoramidothioate and O-(2-methyl-8-quinolyl) O-methyl N-methyl phosphoramidothioate, when employed internally in cattle at dosages of 50 milligrams per kilogram of body weight, gave substantially complete controls of the above-named helminth organisms. In exactly comparable operations against flies and the named helminth organisms, zero percent controls are obtained with such known compounds as O-(8-quinolyl) O,O-diethyl phosphorothioate and O-(8-quinolyl) O,O-diethyl phosphorate.

A preferred group of methyl quinolyl compounds are those having the formulae:

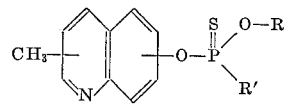

and

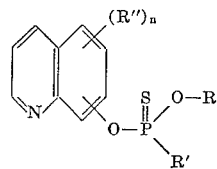

The 6-, 7- and 8-quinolinols and halo-substituted 6-, 7- and 8-quinolinols employed as starting materials in accordance with the teachings of the present invention are prepared by known methods wherein an aminophenol or a suitable halogen-substituted aminophenol is reacted with glycerol or acrolein in the presence of an oxidizing agent such as nitrobenzene. The 5-quinolinols and halo-substituted 5-quinolinols employed as starting materials are produced by the methods described in Jour. Amer. Chem. Soc., 66, p. 1166 (1944) wherein quinoline or a suitable haloquinoline, wherein halogen is substituted on the benzene ring moiety, is treated with nitric acid to produce a 5-nitroquinoline material. The latter material is reduced with hydrogen to produce a 5-aminoquinoline material, the aminoquinoline material subsequent diazotized and the diazotized product thereafter hydrolyzed to produce the desired 5-quinolinol or halo-5-quinolinol starting product.

What is claimed is:
1. A compound corresponding to the formula

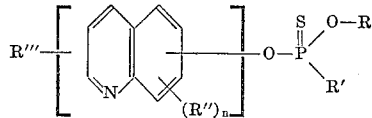

wherein R represents lower alkyl, R' represents a member of the group consisting of amino and lower alkylamino, R'' represents a member of the group consisting of hydrogen, bromine and chlorine, n represents an integer of from 1 to 3 and R''' represents a member of the group consisting of hydrogen and methyl.

2. O-(8-quinolyl) O-methyl N-isopropyl phosphoramidothioate.

3. O-(8-quinolyl) O-methyl N-isobutyl phosphoramidothioate.

4. O-(8-quinolyl) O-methyl N-methyl phosphoramidothioate.

5. O-(8-quinolyl) O-sec.-butyl N-methyl phosphoramidothioate.

6. O-(8-quinolyl) O-isopropyl N-isopropyl phosphoramidothioate.

7. O-(2-methyl-8-quinolyl) O-methyl N-methyl phosphoramidothioate.

References Cited by the Examiner

UNITED STATES PATENTS

| 2,855,425 | 10/1958 | Tolkmith et al. | 167—13 |
| 2,875,234 | 2/1959 | Kauer et al. | 260—461 |
| 2,894,019 | 7/1959 | Maeder et al. | 260—461 |
| 3,159,645 | 12/1964 | Rigterink | 260—302 |

FOREIGN PATENTS

| 654,791 | 6/1951 | Great Britain. |

HENRY R. JILES, *Acting Primary Examiner.*
DONALD G. DAUS, *Assistant Examiner.*